July 31, 1956    R. T. McLELLAND    2,757,040
HEAD PROTECTING SHOCK ABSORBER FOR VEHICLE WINDSHIELDS
Filed June 12, 1953
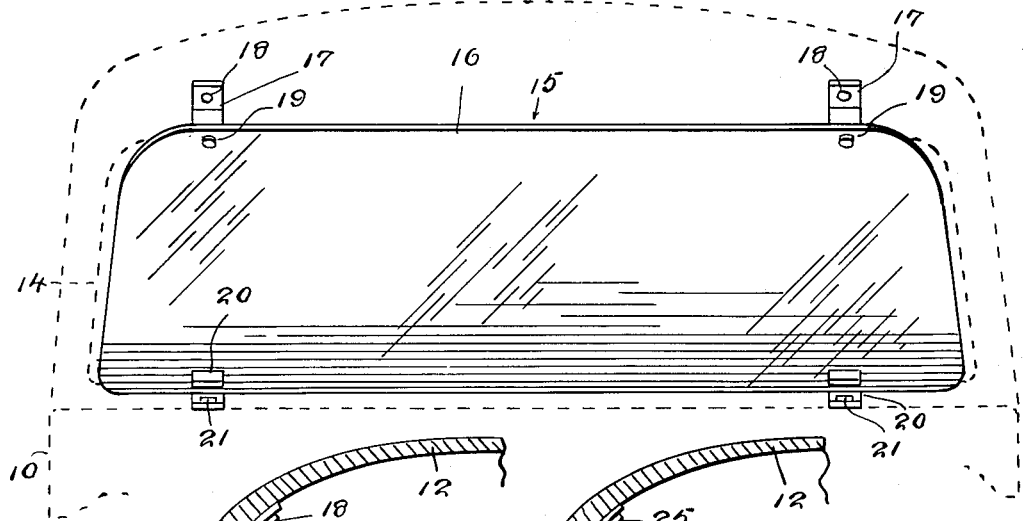
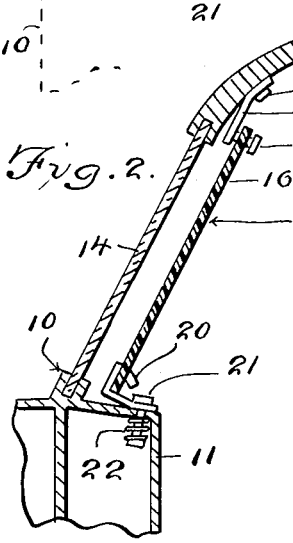
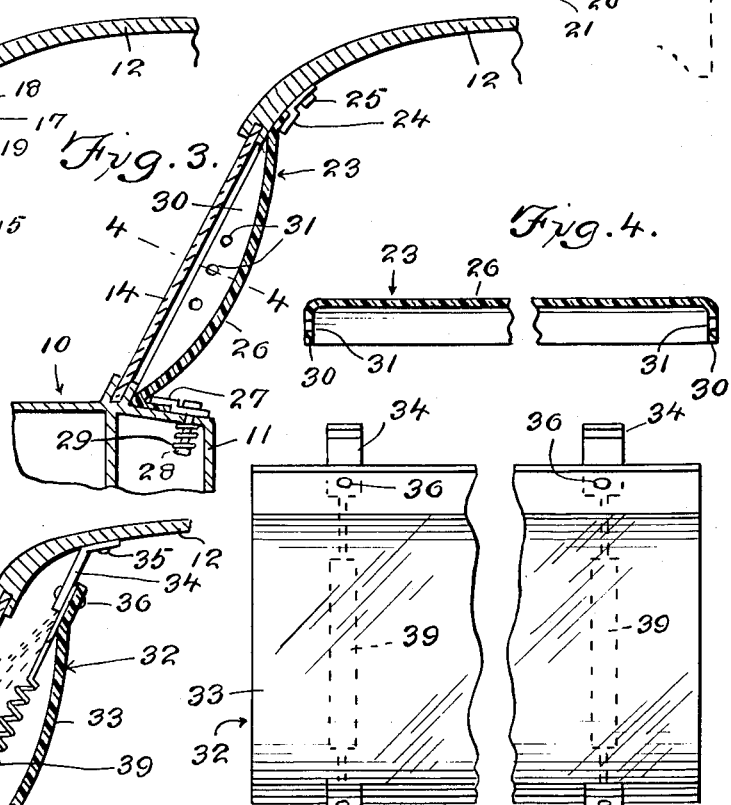
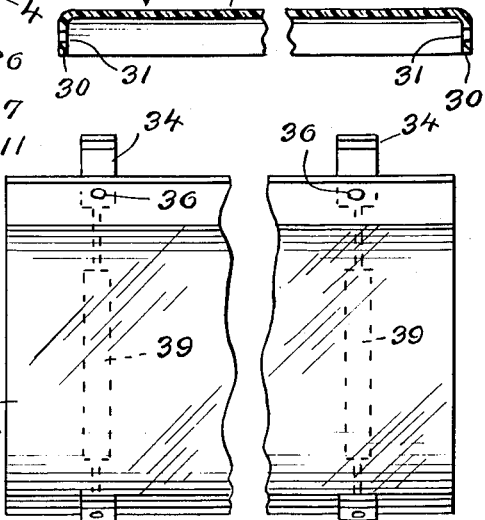
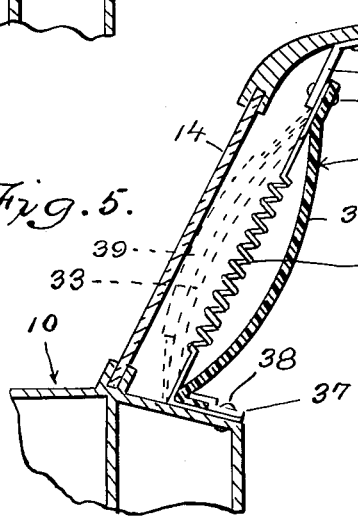
INVENTOR.
Roger T. McLelland
BY Victor J. Evans & Co.
ATTORNEYS

United States Patent Office 2,757,040
Patented July 31, 1956

2,757,040

HEAD PROTECTING SHOCK ABSORBER FOR VEHICLE WINDSHIELDS

Roger T. McLelland, Richmond, Va.

Application June 12, 1953, Serial No. 361,240

2 Claims. (Cl. 296—84)

This invention relates to a safety device, and more particularly to a head shock absorber for a vehicle, airplane or the like.

The object of the invention is to provide a shock absorber which will minimize injuries to passengers of a vehicle or other carrier resulting from body contact with the windshield or other parts of the vehicle.

Another object of the invention is to provide a safety attachment for passenger automobiles and airplanes which acts as a buffer to absorb the force of the blow when the head of a person on the front seat is thrown forward as the result of a collision or sudden stopping of the vehicle from any cause.

A further object of the invention is to provide a head shock absorber which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view of the head shock absorber, looking towards the front of the car.

Figure 2 is a vertical sectional view taken through a vehicle with the shock absorber of the present invention attached thereto.

Figure 3 is a vertical sectional view showing a modified head shock absorber being used.

Figure 4 is a sectional view taken on the line 4—4 of Figure 3.

Figure 5 is a vertical sectional view showing another modified form of the invention.

Figure 6 is a view taken at right angles to the view shown in Figure 5.

Referring in detail to the drawings, the numeral 10 designates a portion of a conventional vehicle such as an automobile, and the vehicle 10 includes a panel or dashboard 11 and a frame 12. There is further provided the usual windshield 14, and the present invention is directed to a head shock absorber 15 which is positioned to the rear of the windshield 14.

The head shock absorber 15 includes a body member 16 which may be made of a suitable transparent material such as a plastic. A means is provided for attaching the body member 16 to the vehicle, and this means comprises clamps 17 which may be made of spring metal, and the clamps 17 are secured to the frame 12 by suitable screws or bolts 18. The upper end of the body member 16 may be secured to the clamps 17 by bolts 19, Figure 2.

A means is provided for connecting the lower edge of the body member 16 to the panel 11, and this means comprises clips 20 which engage the lower edge portion of the body member 16. Each of the clips 20 may be connected to the panel 11 by a bolt 21 which may have a coil spring 22 circumposed thereon in order to help cushion the impact of a person's head hitting the body member 16. The body member 16, being made of a somewhat flexible plastic material that is suitable, will prevent damage or injury to the person's head in the event that the vehicle stops suddenly.

Referring to Figures 3 and 4 there is shown a slightly modified head shock absorber which is indicated generally by the numeral 23. The head shock absorber 23 shown in Figures 3 and 4 may have its upper edge connected to the frame 12 by clamps 24 which are secured in place by bolts 25. The shock absorber 23 includes a concave or arcuate transparent plastic body member 26 and a lip may be arranged on the lower edge of the body member 26 to be engaged by clips 27 which are secured in place by bolts 28 having coil springs 29 thereon. The body member 26 may also be provided with transverse flanges 30 on each end, and the flanges 30 are each provided with a plurality of spaced openings 31 so that in the event the head crashes aaginst the flexible transparent body member 26 the air between the body member 26 and the windshield 14 will be able to pass through the openings 31 so that the pressure will be equalized.

Referring to Figures 5 and 6 of the drawings there is shown still another modification wherein the head shock absorber is indicated generally by the numeral 32. The shock absorber 32 includes a curved body member 33 which may be secured to clamps 34 by rivets or screws 36, and the clamps 34 are adapted to be secured to the inner surface of the vehicle frame by bolts or screws 35. Clamps 37 are connected to the panel 11, and the clamps 37 may be secured in place by bolts 38, the clamps 37 engaging a lip formed on the lower edge of the body member 33. A plurality of spaced coil springs 39 may be interposed between the curved body member 33 and the windshield 14 so as to help provide resiliency and increase the effectiveness of the shock absorber.

From the foregoing it is apparent that a head shock absorber has been provided which will prevent injuries or loss of life to personnel riding in vehicles, airplanes and the like. The shock absorber can be attached to the vehicle in any suitable manner and preferably the attaching means is provided with a resiliency. The mounting may be of such construction as to permit the absorber to be removed when the windshield or other parts of the apparatus are to be cleaned. The clips such as the clips 20 and 17 may be made of spring metal for receiving some of the shock and for releasing the shield by springing back into their normal position. The openings 31 also facilitate the handling of the device and the shape and size of the shock absorber can be varied in order to fit various makes of vehicles. Also, the shock absorber can be applied to other windows of the car besides the front window and the present invention will absorb the impact of a person's head when the person is suddenly thrown forward as when an automobile, airplane, or other carrier of persons suddenly stops. It can be constructed of plastic material which is transparent and resilient such as Plexiglas and can be made in various shapes and sizes. The body member 16 is straight and the supports for the body member 16 also act as a spring to absorb some of the shock when a strain is put on the plate or member 16. In Figures 3 and 4 the body member 26 will absorb shock due to the resiliency of the material and also due to the compression of air between the body member 26 and the windshield 14 and the holes 31 permit the expansion and contraction of the air. The device can be made to cover all of the front windshield and in half sections for smaller windows. The construction is such that the device can be made so that the clips themselves provide the major energy absorbing function when a forward blow comes on any portion of the absorber. In Figures 3 and 4 a compression reaction is created by inward bending of the concave sheet 26 plus the higher than atmospheric pressure created within the body member 26 until equalization can take place by reason of either the exit of air through the vents 31 or return of the sheet to its normal form or both.

When the device of Figure 1 is being used, the body member 16 may be compared to a fireman's safety net in the mechanics of operation. Thus, as soon as the body member or sheet 16 itself becomes deformed by a blow, the force of the blow is distributed and equalized to all points of support at the edge and taken up by bending of the upper clips 17 and lower clips 20. It will be noticed that these clips normally leave some space towards the nearest surface of the windshield 14 or the windshield frame 12 so that they can bend either in or out. In Figures 2 and 3 some added resiliency is provided by the use of the springs 22 and 29. If desired the body members can be made to cover only one half of the windshield if it is preferred to give protection to a passenger seated beside the driver. In Figure 3 the edges of the sheet 26 are permanently shaped to lie upon and conform with the shape of the windshield frame upon which they are to go. The shock absorber can be easily removed by either taking off as many clips as necessary, or merely by compressing the edges and lifting the body member out bodily. This device of the present invention will also act as a buffer plate to keep glass from the occupants in case the windshield is shattered from the outside. Instead of using the springs 39, suitable elastic material may be utilized.

I claim:

1. In combination, a frame, a supporting panel arranged below said frame, a windshield extending between said frame and panel and secured thereto, a head shock absorber arranged in spaced relation with respect to said windshield, said shock absorber adapted to be interposed between the windshield and passengers, said shock absorber being fixed in spaced relation with respect to the windshield to act as a safety barrier, and said shock absorber being of sufficiently yieldable material to properly absorb shock, and said shock absorber being transparent so as not to interfere with visibility through the windshield for driving, said shock absorber being secured for support in position without interfering with its yieldability of shock absorber function, said shock absorber comprising a curved body member bulging outwardly and rearwardly away from the windshield, and flanges extending from the ends of said body member and provided with a plurality of spaced openings therein.

2. In combination, a frame, a supporting panel arranged below said frame, a windshield extending between said frame and panel and secured thereto, a head shock absorber arranged in spaced relation with respect to said windshield, said shock absorber being located between the windshield and passengers, said shock absorber being fixed in front of the windshield to act as a safety barrier and being of sufficiently yielding material to properly absorb shock, said shock absorber comprising a transparent body member having its major portion of concave shape, said body member bulging outwardly in a direction away from the windshield, the upper portion of said body member being flat, clamps engaging the upper flat portion of said body member and said clamps being secured to said frame, a lip arranged along the lower end of said body member, clips arranged in engagement with said lip, bolts securing said clips to said panel, coil springs circumposed on said bolts, said body member being provided with transverse flanges on each end, said flanges being provided with a plurality of spaced openings whereby in the event the head crashes against the flexible transparent body member, the air between the body member and the windshield will be able to pass through the opening so that the pressure will be equalized.

References Cited in the file of this patent

UNITED STATES PATENTS

| 1,459,834 | McKinnon | June 26, 1923 |
| 1,554,474 | Walker | Sept. 22, 1925 |
| 1,567,252 | Epard | Dec. 29, 1925 |
| 1,936,251 | McCullough | Nov. 21, 1933 |
| 2,102,454 | Bennett | Dec. 14, 1937 |
| 2,592,573 | Joncas | Apr. 15, 1952 |
| 2,706,659 | Landis | Apr. 19, 1955 |
| 2,715,042 | Lancaster | Aug. 9, 1955 |

FOREIGN PATENTS

| 651,150 | Germany | Oct. 8, 1937 |
| 125,424 | Sweden | July 5, 1949 |